United States Patent
Overton et al.

(10) Patent No.: US 7,206,434 B2
(45) Date of Patent: Apr. 17, 2007

(54) METHOD AND SYSTEM FOR MEASUREMENT OF THE DURATION AN AREA IS INCLUDED IN AN IMAGE STREAM

(75) Inventors: Kenneth J. Overton, Plano, TX (US); Mark S. Muench, Carrollton, TX (US); Charles H. Hayden, Jr., Plano, TX (US); Norman S. Carmichael, Flower Mound, TX (US)

(73) Assignee: Vistas Unlimited, Inc., Plano, TX (US)

( * ) Notice: Subject to any disclaimer, the term of this patent is extended or adjusted under 35 U.S.C. 154(b) by 516 days.

(21) Appl. No.: 09/903,122

(22) Filed: Jul. 10, 2001

(65) Prior Publication Data

US 2003/0012409 A1    Jan. 16, 2003

(51) Int. Cl.
  *G06K 9/00*    (2006.01)
(52) U.S. Cl. ...................... 382/103; 348/586
(58) Field of Classification Search .............. None
  See application file for complete search history.

(56) References Cited

U.S. PATENT DOCUMENTS

| | | | |
|---|---|---|---|
| 4,084,184 A | | 4/1978 | Crain |
| 4,693,378 A | * | 9/1987 | Azegami et al. ............ 209/586 |
| 4,970,666 A | | 11/1990 | Welsh et al. |
| 5,264,933 A | | 11/1993 | Rosser et al. |
| 5,353,392 A | | 10/1994 | Luquet et al. |
| 5,424,770 A | | 6/1995 | Schmelzer et al. |
| 5,436,672 A | | 7/1995 | Medioni et al. |
| 5,479,597 A | | 12/1995 | Fellous |
| 5,491,517 A | | 2/1996 | Kreitman et al. |
| 5,515,485 A | | 5/1996 | Luquet et al. |
| 5,543,856 A | | 8/1996 | Rosser et al. |
| 5,566,251 A | | 10/1996 | Hanna et al. |
| 5,600,366 A | | 2/1997 | Schulman |

(Continued)

FOREIGN PATENT DOCUMENTS

| | | |
|---|---|---|
| EP | 0 792 068 B1 | 8/1997 |
| EP | 0 848 883 B1 | 6/1998 |
| EP | 0907145 A2 | 4/1999 |
| FR | 2 730 837 | 8/1996 |
| WO | WO 95/10919 | 4/1995 |

(Continued)

OTHER PUBLICATIONS

Schofield, et al., "A System for Counting People in Video Images Using Neutral Networks to Identify the Background Scene," Pattern Recognition, vol. 29, No. 8, pp. 1421-1428, Aug. 1, 1996.

(Continued)

*Primary Examiner*—Bhavesh M. Mehta
*Assistant Examiner*—Christopher Lavin
(74) *Attorney, Agent, or Firm*—Marc A. Hubbard; Gardere Wynne Sewell LLP

(57) ABSTRACT

A system and method for calculation of the duration a target area included within an image stream utilizes a three-dimensional model of at least one target area within a site. A counter is incremented during periods, for example on a frame-by-frame basis, when the target area is included in the image stream.

An occlusion parameter is calculated for adjusting the calculated duration that the target area is included within the image stream. The occlusion parameter facilitates accounting for variations in a target area obstruction and is used for making adjustments to a counter so that a count indicative of a duration reflects variations in obstructions of the target area. A foreground parameter associated with target area is calculated for adjusting the calculated duration of the target area. The foreground parameter facilitates accounting for variations in the viewability of an image included within the target area resulting from various camera zooms.

38 Claims, 9 Drawing Sheets

U.S. PATENT DOCUMENTS

| | | | |
|---|---|---|---|
| 5,627,915 | A | 5/1997 | Rosser et al. |
| 5,640,320 | A | 6/1997 | Jackson et al. |
| 5,715,018 | A | 2/1998 | Fasciano et al. |
| 5,731,846 | A | 3/1998 | Kreitman et al. |
| 5,799,055 | A | 8/1998 | Peshkin et al. |
| 5,808,695 | A | 9/1998 | Rosser et al. |
| 5,850,352 | A | 12/1998 | Moezzi et al. |
| 5,892,554 | A | 4/1999 | DiCicco et al. |
| 5,903,317 | A | 5/1999 | Sharir et al. |
| 5,917,553 | A | 6/1999 | Honey et al. |
| 5,923,365 | A | 7/1999 | Tamir et al. |
| 5,953,076 | A | 9/1999 | Astle et al. |
| 6,100,925 | A | 8/2000 | Rosser et al. |
| 6,122,013 | A | 9/2000 | Tamir et al. |
| 6,159,142 | A | 12/2000 | Alt |
| 6,208,387 | B1 | 3/2001 | Magnusson et al. |
| 6,262,778 | B1 | 7/2001 | Nonweiler et al. |
| 6,266,100 | B1 * | 7/2001 | Gloudemans et al. ....... 348/587 |
| 6,292,227 | B1 | 9/2001 | Wilf et al. |
| 6,297,853 | B1 * | 10/2001 | Sharir et al. ................ 348/589 |
| 6,327,004 | B1 | 12/2001 | Miyabayashi et al. |
| 6,366,316 | B1 | 4/2002 | Parulski et al. |
| 6,384,871 | B1 | 5/2002 | Wilf et al. |
| 6,393,162 | B1 | 5/2002 | Higurashi |
| 6,441,864 | B1 | 8/2002 | Minami et al. |
| 6,446,261 | B1 | 9/2002 | Rosser |
| 6,487,721 | B1 | 11/2002 | Safadi |
| 6,522,787 | B1 | 2/2003 | Kumar et al. |
| 6,525,741 | B1 | 2/2003 | Klassen et al. |
| 6,731,788 | B1 * | 5/2004 | Agnihotri et al. ........... 382/157 |

FOREIGN PATENT DOCUMENTS

| | | |
|---|---|---|
| WO | WO 96/05689 | 2/1996 |
| WO | WO 97/03517 | 1/1997 |
| WO | WO 97/09822 | 3/1997 |
| WO | WO 97/12480 | 4/1997 |
| WO | WO 97/26758 | 7/1997 |
| WO | WO 98/28906 | 7/1998 |
| WO | WO 99/26415 | 5/1999 |
| WO | WO 99/48285 | 9/1999 |
| WO | WO 00/14959 | 3/2000 |

OTHER PUBLICATIONS

McKenna, et al., "Tracking Groups of People," Computer Vision and Image Understanding vol. 80 No. 1, pp. 42-56, Oct. 27, 2000.

Overton, Kenneth J. et al., "Method and Apparatus for Real Time Insertion of Images into Video", application No. 09/707,624, Nov. 7, 2000.

* cited by examiner

METHOD AND SYSTEM FOR MEASUREMENT OF THE DURATION AN AREA IS INCLUDED IN AN IMAGE STREAM

TECHNICAL FIELD OF THE INVENTION

This invention relates in general to the field of video transmission systems and, in particular, to a system and method for measuring the duration an image is included within an image stream.

BACKGROUND OF THE INVENTION

Teams, leagues, and venue owners typically charge advertisers increased fees when their banners or signs appear periodically during portions of a sports telecast. Sporting events have long provided for additional advertising revenue generation during a telecast event as well as during commercial breaks. For example, broadcasters charge a fee per on-air time to advertisers having commercials viewed during portions of a sporting event telecast. Advertisers are often charged fees related to the on-air time in the telecast that viewers may see advertisement logos and banners common in sporting arenas and parks. For example, the walls of a baseball field are commonly comprised of numerous adjacent panels, one or more of which are typically leased to advertisers for display of an advertiser logo. Ice hockey also includes advertising banners typically displayed on the dasher boards of the hockey rink as well as beneath the ice itself. In addition, football fields often include sponsor logos painted on the football field in addition to logos on the stadium walls. Sporting franchises and sporting broadcasters also use rotating banner advertisements. These banner advertisements, rather than being fixed for the duration of a broadcast, are maintained on a rotatable chassis that allows different wall panel advertisements to be displayed during the game. A broadcaster may be interested in measuring portions of images that are displayed during a broadcast of the video.

One incentive for inserting images into video is for realizing enhanced or additional advertising revenue for television broadcasters. Many systems and methods have been proposed for inserting static and dynamic images, such as advertising, into video in real time. These prior art systems and methods suffer from various drawbacks and problems, many of which are detailed in U.S. Pat. No. 5,892,554 to DiCicco, et al. A newly developed technique promises to revolutionize advertising in, for example, sporting event broadcasts. Computer facilitated broadcast systems are able to insert images, for example a graphic image of an advertiser's banner, into a video stream telecast. Generally, a site from which a telecast is to be performed has a three-dimensional model made thereof. The model includes target areas for insertion of graphic or video images. The target areas may be real areas of the site, for example a dasher board of a hockey rink, or may be imaginary surfaces, for example synthetic billboards. Generally, each frame of the video transmission is analyzed and images written into the target areas in any frames containing the target areas being broadcast. A three-dimensional model of the site allows for realism to be obtained during various camera orientations and focus.

Broadcasters must be able to determine the on-air duration of advertisements physically present or inserted into the video stream. Unfortunately, techniques for measuring an exposure time for these images during a telecast suffer from many disadvantages. For example, the duration of the broadcast of physical signage is calculated manually, and typically only after the broadcast has been performed. Manual calculation of the telecast transmission time, or on-air time, of an advertisement is generally performed by an operator, using accrued measurement techniques such as a hand-actuated stopwatch. This method is subject to a multitude of errors and inaccuracies, including failures in operator attentiveness and operator delay time. Moreover, the operator performs these measurements by watching a tape of the original broadcast sometime after the broadcast has been made. These techniques also require multiple operators to watch the same or another version of the taped broadcast to make measurements for multiple advertisements. As a result, these traditional methods require large numbers of resources and suffer from measurement inaccuracies and delays which in turn limit their use.

Moreover, tariffs for advertisements are usually calculated using these prior art techniques and are typically limited to revenues that may be derived from traditional and existing banner advertisements.

The terms 'telecast' and 'broadcast' are used within the description to facilitate understanding of the invention. However, telecast and broadcast media are exemplary only. The present invention is not limited to application to television transmissions. Rather, the present invention may be used in any number of communication technologies, such as television, cable, Internet, satellite, digital theater, etc., capable of transmitting graphic media (e.g., image streams).

While the technology for providing inserted images into a video is being developed, techniques for accurately assessing advertising revenues therefrom have yet to be addressed. To implement a fair fee charging system, the duration of the broadcast of these banners is calculated manually and typically after the broadcast has been performed. Manual calculation of the telecast transmission time, or on-air time, of an advertisement is generally made by a person watching a tape of the original broadcast some time after the broadcast has been made. Often, calculation of the on-time transmission of a particular advertisement is made by such crude and error prone techniques as a simple had actuated stop-watch. Heretofore, tariffs for advertisements made according to image inserting techniques are limited to the prior art techniques utilized for traditional banner advertisers.

SUMMARY OF THE INVENTION

An object of the present invention is to provide a method and system for calculating the duration synthetic and/or real images, or portions thereof, are included in an image stream which overcome one or more problems with prior art methods and apparatus.

In accordance with an embodiment of the present invention, a system and method for calculating the duration one or more target areas is included in an image stream utilizes a three-dimensional model of a site including at least one target area assigned to a physical area within the site from which the image stream is captured. A counter maintained in association with the target area is incremented during periods, for example on a frame-by-frame, or field-by-field, basis, when the target area is included in the image stream. Accordingly, the counter maintained in association with the target area provides an indication of the duration that an image within the target area is included in an image stream. Thus, the counter provides a duration measurement that the portion of the site included in the physical area corresponding to the target area (an image captured therefrom referred to as a physical image) is included in the image stream.

In accordance with another embodiment of the invention, the image stream captured by an image capture system, such as one or more cameras, may be processed to include synthetic images not present in the site from which the image capture was performed. The captured image stream may be manipulated by image insertion technologies and processed to include the synthetic images inserted into a target area associated with a physical area of the site. Accordingly, the counter provides an indication of the duration a synthetic image is included in the target area of the processed image stream.

In accordance with another embodiment of the present invention, the percentage of the target area within the field of view may be used to determine whether or not a counter associated with the target area is incremented.

In accordance with another embodiment of the present invention, an occlusion parameter associated with a target area is calculated for adjusting the calculated duration the target area is included in the image stream. The occlusion parameter facilitates accounting for variations in the obstruction to an image (physical or synthetic) corresponding to a position of the target area and is used for making adjustments to a counter so that the count thereof is indicative of variations in obstructions of the image.

In yet another embodiment of the present invention, a foreground parameter associated with a target area is calculated for adjusting the calculated duration the target area is included in the image stream. The foreground parameter facilitates accounting for variations in the viewability of an image within the target area that results from various camera zooms.

In yet another embodiment, the counter can be triggered by a threshold of the percentage of the visible video image covered by the target area, both considering and excluding the area of any occluding bodies.

In yet another embodiment of the invention, real-time calculations of the duration that one or more target areas are included within an image stream provide a mechanism for ensuring a desired duration a synthetic image is included within an image stream is met. Analysis of metrics or other statistical data collected during image capture or transmission and indicative of the duration a target area is included within an image stream may indicate that image data assigned to a particular target area is unlikely to be included within the image stream for a predefined, desired duration. The image data may then be reassigned to another target area in an attempt to achieve the desired duration of inclusion of the image data within the image stream.

These and additional objects and advantages of the invention will be apparent from the following description of a preferred embodiment of the invention, made with reference to the appended drawings.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 18 of the drawings, like numerals being used for like and corresponding parts of the various drawings.

One application for a real time image insertion system for manipulation of image streams is in a live broadcast of a sporting or entertainment event or the like from a stadium, arena, track, course or other sports or entertainment venue. Such a system is described below in connection with this application. The system of the present invention may be used for real-time measurement of exposure duration of synthetic images in an image stream. For example, the duration inserted images, such as advertisements that are not physically present in an entertainment venue from which an image stream is captured, manipulated and broadcast, may be accurately measured in real time according to the teachings of the invention. Advertising revenues and/or fees for these inserted images may then be calculated as desired in response to the calculated duration the inserted images are included within the image stream.

Although the image duration measurement system of the present invention has particular advantages when used in conjunction with an image stream manipulation system, it can also be used in other applications. The system of the present invention may also be used for a real-time measurement of the duration an image is captured from a physical object present in the site from which the image stream is captured, such as images captured from a physical advertisement in an entertainment venue from which an image stream is captured.

Figure 1:
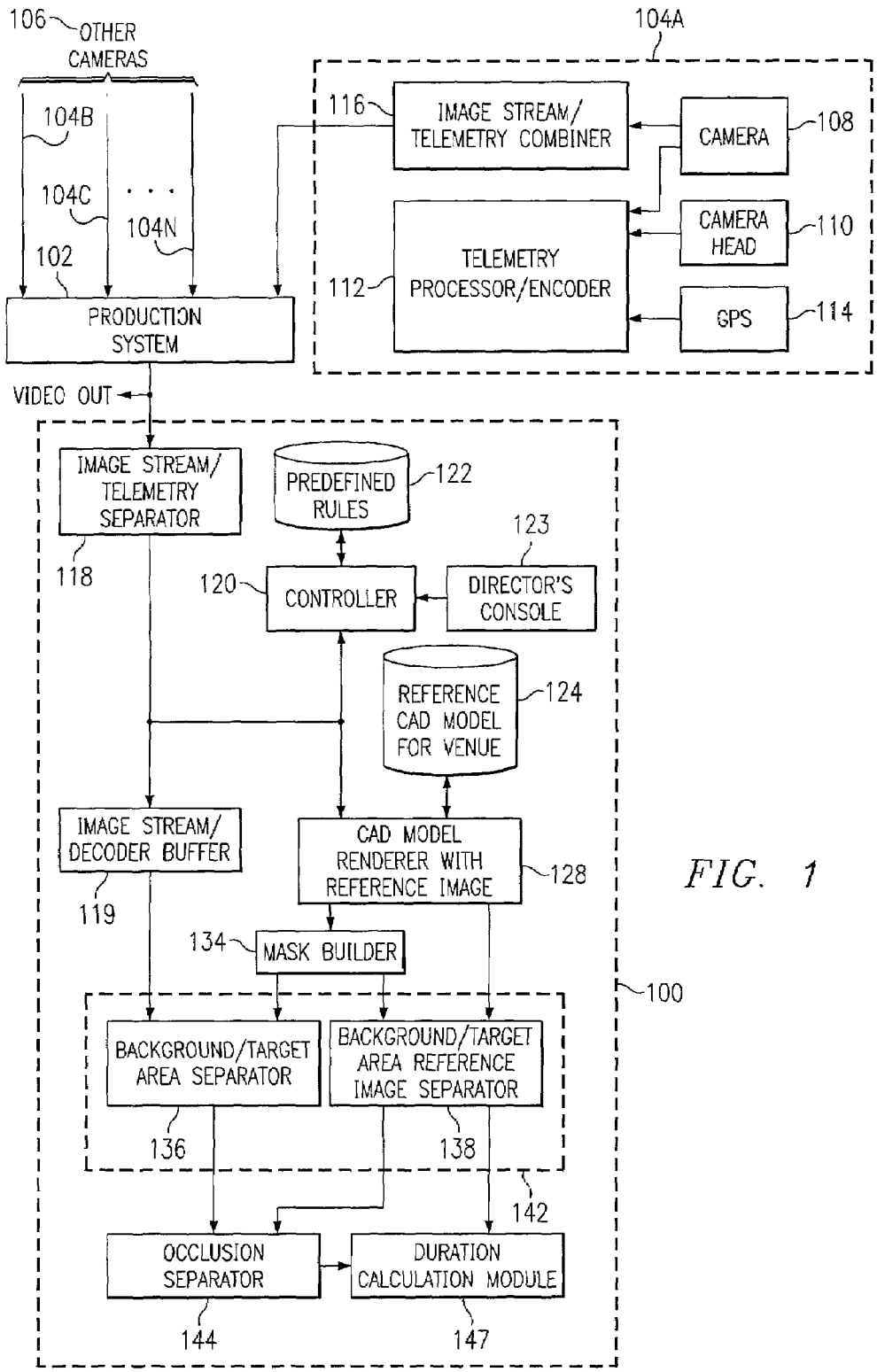
FIG. 1 is a schematic representation of a real time image insertion system for manipulation of image streams.

The details of image measurement, and the techniques of manipulating image streams, as performed by the image measurement system 100 illustrated in FIG. 1 are outside the scope of the present invention and the technique described is illustrative only. It should be understood that the image insertion system is operable to manipulate a three-dimensional model of a site from which an image stream is captured and insert images, for example bit maps providing graphic depictions of advertisements, into frames of the image stream. Thus, an image stream may include images obtained from an image capture system, for example a camera system 104A–104N, as well as images of the image stream having synthetic image/s inserted therein, an exemplary technique including operations generally described below with reference to FIGS. 1 through 10.

A captured image stream is defined herein as one or more image frames (or, alternatively, fields) captured from physical objects present in the site by an image capture system. An image stream is defined herein to refer to the captured image stream and/or the product of processing that may be performed on the captured image stream such as manipulation of the images within the image stream including manipulation by image insertion technologies. The image stream may include images solely captured from the physical site from which the image stream is captured, or the image stream may include images captured from the site and/or synthetic images (inserted into the image stream) not physically present within the site from which the image stream is captured.

A physical image is defined herein to refer to an image in an image stream that is captured from a physical object with the image capture system. A synthetic image is defined herein to refer to an image inserted into an image stream that is not captured from an object physically present in the site from which the image stream is captured.

A target area is defined herein to refer to an area of interest within a physical site and/or a corresponding area within a model of the physical site. A captured image stream and an image stream are said to include the target area, or a portion thereof, when the field of view of an image capture system includes the area of interest (or a portion thereof). For example, a dasher board in a hockey arena may be specified as a target area. The dasher board specified as the target area will have a corresponding area in a three-dimensional model of the hockey arena that is referred to as the target area as well. The present invention contemplates the calculation of a duration that one or more target areas may be included within an image stream obtained by an image capture system. The target areas may be present in an image stream that may be obtained during a single event in a particular venue, or multiple events in separate venues.

A target image is defined herein as an image within the target area in an image stream and may be a physical image or a synthetic image or a composite image thereof.

A reference image is the appearance of a target area surface within the actual site that will be used for occlusion processing and may be an image associated with a target area that is rendered by an image rendering system. The reference image may be a rendered image of a physical object (such as a physical object within the site from which the image stream is captured), or the reference image may be a rendered image of a synthetic image that is to be inserted into a target area of an image in an image stream. Reference images are, in general, utilized to form a target image for either insertion into a target area and facilitation of duration measurement thereof or to facilitate duration measurements of physical images having target areas assigned thereto. Synthetic target images are developed, in part, by a rendered reference image.

As described herein, the present invention provides a technique and mechanism for calculating the duration the target area is included in an image stream. Accordingly, the technique and mechanism provide for calculating the duration an image (physical or synthetic) is included within the target area may be applied to calculating durations an image is included within an image stream.

Referring to FIG. 1, a real time image measurement system 100 for calculating the duration one or more target areas are included in image streams is schematically represented by its primary functional components. These components are implemented as a combination of hardware and software, and are not intended to represent discrete hardware or software components or as being limited to any particular implementation unless otherwise noted.

The image measurement system 100 receives an image stream from an image production system 102. The image production system 102 selects an image signal from a camera system 104A or one of a plurality of other camera systems 104B–104N. This selected image stream is then provided to an image measurement system 100 for duration measurements of physical images within the physical venue, such as existing signage, synthetic images such as advertising, or areas within the image stream that may have synthetic images inserted therein after the image stream is subjected to processing. The image measurement system may be located with the video production system at, for example, a mobile production facility. It may also be remotely located at a central production facility or even further downstream, such as at a local television station or cable operator. Alternately, image duration measurements may take place before selection of an image stream, for example by measuring images in the image stream from each camera system prior to it being provided to the production system.

In another embodiment, production system 102 may incorporate further functionality into the image measurement system as will be discussed in further detail in conjunction with FIG. 11. Generally, the output of production system 102 with multiple inputs provided by other camera systems 104B–104N may be compared and a duration counter for a camera input selected by a production control unit such as a production truck may be updated. For example, multiple cameras are commonly used to capture image streams from a single venue. Image streams from the multiple cameras are then provided to a production system. The production system is operable to provide an input to an image stream/telemetry separator 118. Generally, the input at any given instance provided to image stream/telemetry separator 118 will include an image stream taken from a single camera of the other camera systems 104B–104N. Thus, production system 102 is operable to switch the image stream that is provided to video/telemetry separator that is processed and ultimately output a selected image stream from the system in the form of a video telecast or other processed image stream. Accordingly, because a counter (as described more fully hereinbelow) is used to accumulate a measure of the duration that an image is included in an output image stream, a switching mechanism must be utilized such that the counter is incremented only when an image is included in an image stream being output by the production system 102 rather than incrementing the counter when the image is included in any image stream captured by one or more of the other camera systems 104B–104N.

A camera system 104A generates an image stream encoded with telemetry data indicating at least where the camera is pointing in relation to a known or predefined three-dimensional frame of reference of a site. The camera system includes a conventional video camera 108 connected to a camera head 110. The camera head 110 includes sensors that generate information indicating the azimuth and elevation, or some other coordinates defining the direction of the optical axis of the camera 108. This telemetry information is provided to the telemetry processor and encoder 112. Camera 108, or some other attached sensors, also provides the telemetry processor and encoder with additional telemetric information indicating, for example, the focal length and aperture of the camera's lens. The focal length will vary with the degree of zoom of the lens. The aperture will vary with changing light conditions. Optionally, additional sensor information, for example global positioning satellite information 114 may also provide information to the telemetry processing and encoder indicating the position of the camera in terms of its longitude, latitude and elevation. The position of the camera can easily be determined and may be permitted to move rather than remain fixed in a predefined location. Using an image stream timing signal provided by the camera, the telemetry processor and encoder generates a data signal that can be synchronized with the image stream generated by the camera. This data signal encodes the telemetric information for each frame of the image stream generated by the camera. An image stream/telemetry combiner 116, which may be part of the telemetry processor, then combines the data signal with the image stream. With the telemetry information synchronously encoded in the image stream, sufficient information is provided to allow synthetic images to be inserted into the image stream at any point downstream of the camera system.

While manipulation of an image stream is described herein with references to one or more frames that are included within the image stream, it should be understood that the frames may be comprised of sub-elements, for example fields. For example, frames of a typical video telecast are comprised of even and odd fields. Thus an image stream comprising a video stream or telecast having a 30 Hz frame rate may actually be formed by two 60 Hz fields. Manipulation and analysis of an image stream or image telecast described herein with reference to frame-based operations is illustrative only and is described as such for simplification of discussion. It is understood that the same general procedures and techniques may be implemented by using field-based operations.

Once image measurement system 100 receives an encoded image stream, image stream/telemetry separator 118 extracts the telemetry data for a particular image within the image stream. The image stream is further decoded by an image stream decoder/buffer 119 to extract and store an image from each frame of the image stream. An example of an image included in an image stream generated by a camera is illustrated as image 400 in FIG. 2. This particular example is of an ice hockey game. It includes a dasher board 402, a first hockey player 404 and a second hockey player 406. The operation of the image measurement system 100 and the image measurement process will be described below in reference to image 400. However, the image measurement process will be repeated for an image in each successive frame of an image stream, at least to the extent the image changes between frames.

A controller 120 represents a software and hardware entity, or a collection of entities, that coordinate processes occurring within the functional components of image measurement system 100. Using the telemetry data and other information describing an event occurring at the site, for example the inning number of a baseball game, the score or other information on the flow of a sports game, controller 120 accesses predefined image measurement rules in database 122 to determine, based at least in part on a camera identifier embedded in the telemetry data, what areas—referred herein as target areas—included in the venue and that may be included in the image stream are to be subjected to a duration measurement throughout the image stream (or a portion thereof). The target area may be, for example, an area within a sporting arena in which advertising displays will be synthetically inserted within the processed image stream. Alternatively, the target area may be, for example, an area within the sporting arena in which physical signage is present at the site and may be captured by the image stream. Thus, a target area of the site that is included in an image stream may have physical image/s and/or synthetic image/s included therein. Having predefined rules allows a preselected target area to be subjected to a duration measurement that results in a quantitative measure of the duration the target area is included in an image stream. By calculating a quantitative measure of the duration a target area is included within an image stream, the duration that a physical image or synthetic image included within the target area is also made. Furthermore, a target area may change at predefined times or periods, or based on the status of the event being subjected to image capture, that is the location of a target area in a site may change during image stream capture or processing.

An advertising director, for example, may also monitor and control measurement processes during an event using a director's console 123 that includes software and hardware for inputting commands and data to controller 120. For example, the director may provide the system with information concerning the state of the event at the site, if such information is not otherwise available from a database. The director may also override the image measurement rules in database 122 and manually select target areas for duration measurements, or the director may modify the rules dynamically. The advertising director may also set up and maintain databases that maintain the target areas. The advertising director's console will include monitors so that the director can monitor the image stream during duration measurements of target areas. The director's console may also allow the director to modify databases storing CAD models for the reference images, which are described below, and to monitor and adjust steps of the target area measurement process as described below.

For each target area included within the image stream or processed image stream, a reference image may be assigned to a predefined target area at the site. The reference image is rendered based on a predefined reference model of the target area. More than one target area may be defined and appear in any given image stream. The model is, preferably, a computer aided design (CAD) model that defines surfaces (real or imaginary) of target areas mathematically thus allowing the model to be rendered from any angle. The telemetry data extracted from the captured image stream allows the model to be rendered from a viewpoint that is substantially the same as the location and orientation of the camera generating the image stream. This rendering, which is in effect a synthesized image of the target areas of the site that is aligned with the image stream, is then used to guide duration measurements of the target areas within the image stream. If the camera position changes between frames, this rendering takes place for each such frame. However, if it does not change between frames, the renderings for the prior frame may be used. Accordingly, a reference image corresponding to a physical image object may be rendered at the various orientations and focus from which the physical image may be captured.

Figure 2:
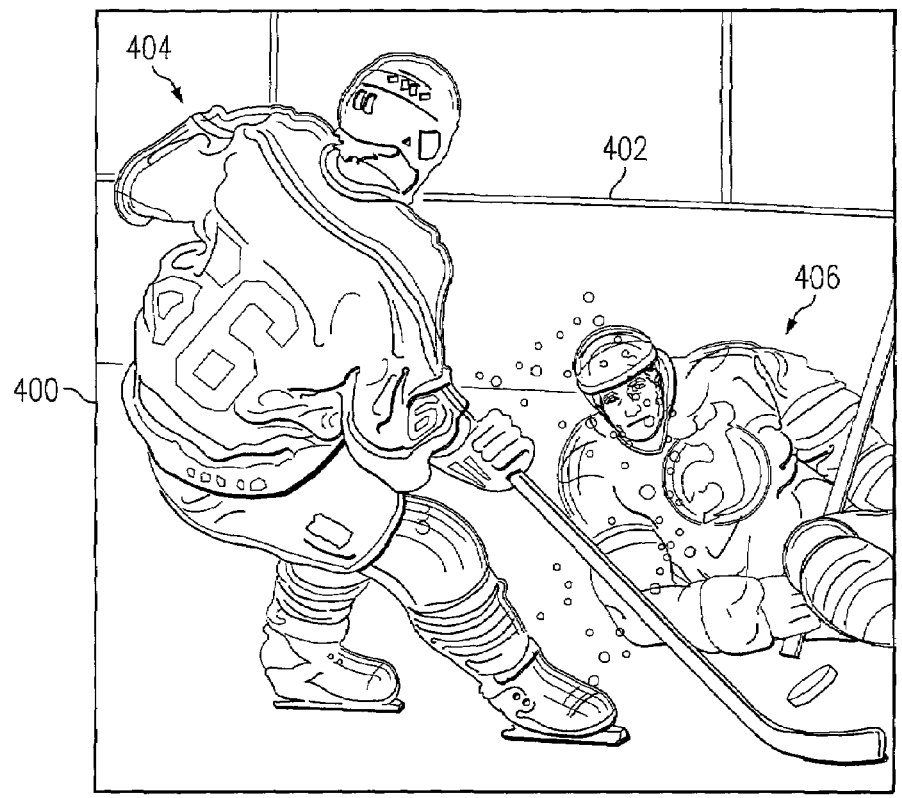
FIG. 2 is an example of a video image generated by a video camera prior to insertion of a target image.
Figure 3:
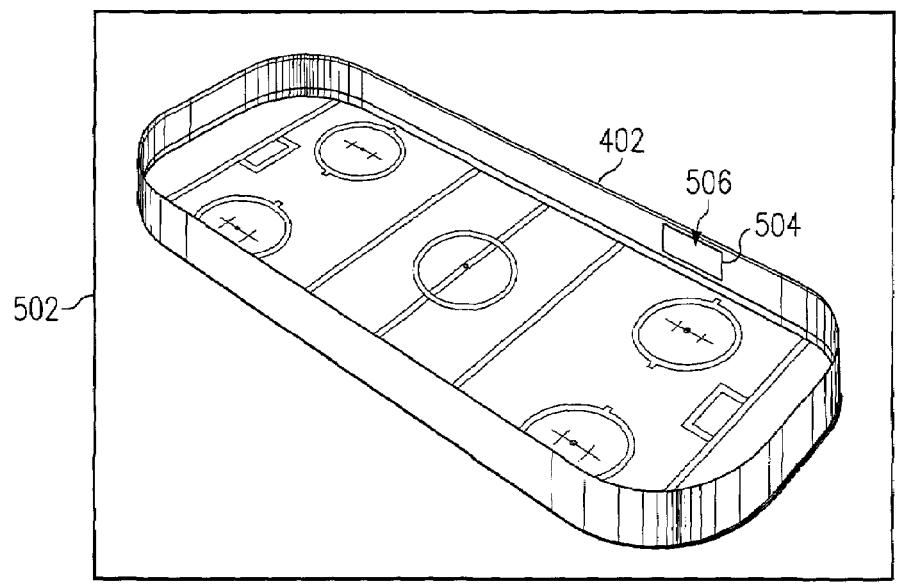
FIG. 3 is a rendering of a model of a site at which the video image of FIG. 2 was taken and in which is defined a target area containing a reference image.
Figure 4:
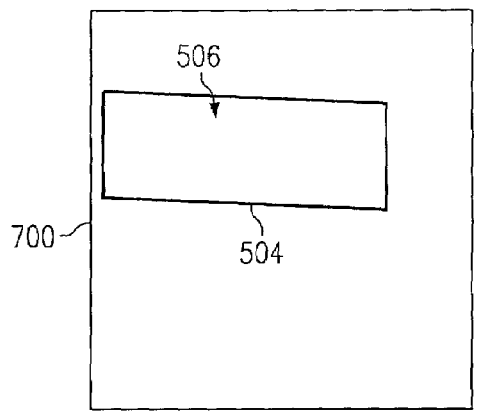
FIG. 4 is an image containing a rendering of the model of the site with the reference image, the image rendered from the same position and angle of the camera generating the video image of FIG. 2.

Referring briefly also to FIGS. 2 and 3, image 502 of FIG. 3 is an example of a rendering of a predefined model of the site, in which the image shown in FIG. 2 was taken. A computer aided design (CAD) system, which can be standard, commercially available CAD software executing on a computer, generates the rendering from the predefined model. Note that the rendering is not made from the same position and camera angle as the video image of FIG. 2. A target area 504 in this example is a predefined area of the surface of the dasher board 402. The model could also have imaginary surfaces defined as target areas. For example, the model could have defined the position of an imaginary banner hung from the ceiling of the hockey arena. A target area surface, real or imaginary, need not be flat. In this figure, the target area has been rendered with a reference image. The reference image can be stored, for example, as a bit map image that is inserted into the rendered model. In this particular example, it is a blank white wall, that is the portion of the dasher board having a target area designated therewith is white, or blank, and is accordingly represented by a like reference image. However, the reference image may be an image of an advertisement that is physically located on, for example, dasher board 402 such as a corporate logo. The reference image may be rendered from various angles to correspond to the different orientations that the physical area having the target area assigned thereto may be captured in the image stream. The reference image may be an image of a synthetic element to be later inserted into the image as well. For example, an advertisement may be inserted within a specific target area and thus appear in the target area of a final processed image. The reference model of the site with reference images for each target area is stored in a CAD file 124 shown in FIG. 1.

Figure 5:
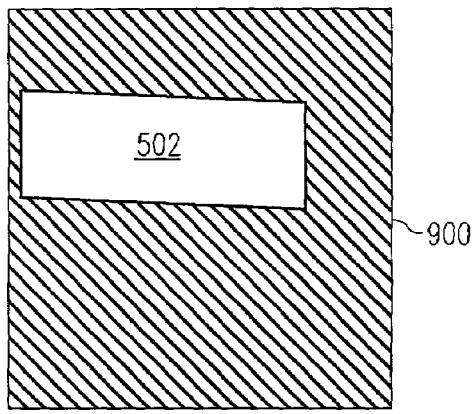
FIG. 5 is a target area processing mask generated from the image of FIG. 4.
Figure 6:
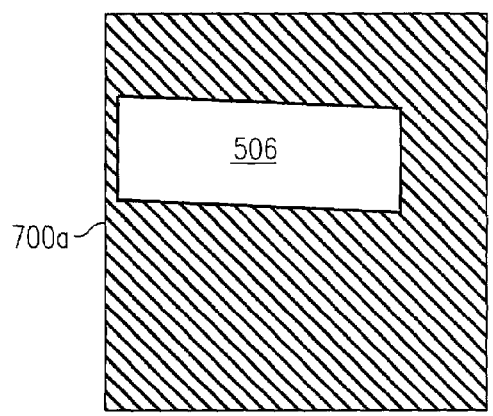
FIG. 6 is a masked reference image generated by applying the mask of FIG. 5 to the image of FIG. 4.

Referring now to FIGS. 1, 2 and 5, CAD model renderer 128 renders a baseline image 700 of the CAD model stored in CAD file 124, based on the telemetry data from the camera that has captured image 400 shown in FIG. 2. Baseline image 700 of FIG. 4 includes target area reference image 506 inserted into target area 504. As previously described, the telemetry data indicates the identification, angle, focal distance and aperture setting of the camera taking the image 400. The telemetry data may also indicate the camera's location if the camera it not fixed in location.

The image duration measurement process of the present invention may also include generating a target area mask. FIG. 5 illustrates mask image 900 for the exemplary image 400 of FIG. 2. A target area mask 502 is generated by a mask builder 134 using the reference image generated by model renderer 128. To generate the mask image 900, target area mask 502 within mask image 900 has all pixels therein set to a predefined value and all pixels outside target area mask 502 are set to another predefined value. In the mask image 900, all target area mask 502 pixels are white and all pixels surrounding target area mask 502 are black.

Target area mask 502 is used for several purposes in connection with an occlusion processing step. Referring now to FIG. 1, target area mask 502 is used by a background/target area reference image separator 138 to separate or mask each target area reference image 506 within baseline image 700 generated by model renderer 128. In the example illustrated in FIG. 4, the mask will be used to separate target area reference image 506 within baseline image 700 from the rest of the image, resulting in a masked reference image 700a shown in FIG. 6. Target area mask 502 is used to locate and separate within the original image the target area/s from the rest of the non-target areas of the image, which will be referred to as the background. This function is performed by background/target area separator 136.

Figure 7:
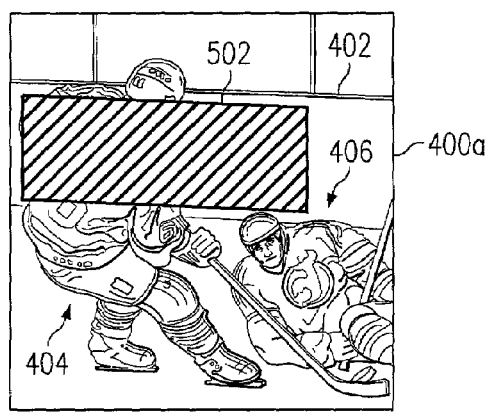
FIG. 7 is a masked background image generated by applying the target area mask of FIG. 5 to the original video image of FIG. 2.
Figure 8:
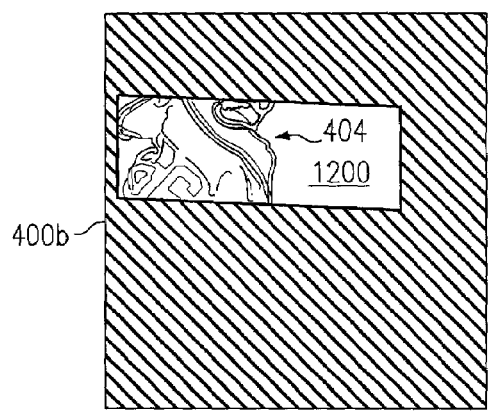
FIG. 8 is a masked target area image generated by applying the target area mask of FIG. 5 to the original video image of FIG. 2.
Figure 9:
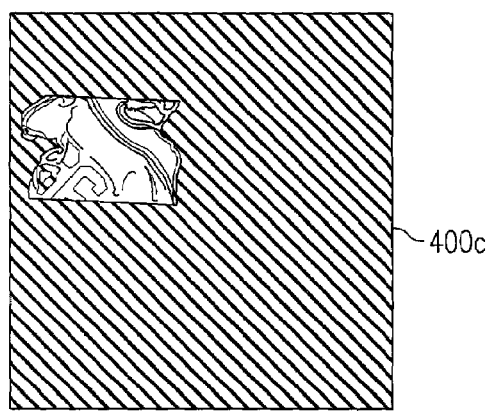
FIG. 9 is an occlusion image generated by comparing the masked target area image of FIG. 8 to the masked reference image of FIG. 6.

FIG. 7 and FIG. 8 illustrate the two images that result from separating the background from the target area in the original image 400 shown in FIG. 2. FIG. 7 is a masked background image 400a, which includes all of the original image except that portion within target area 504, which is blank. FIG. 8 is a masked target area image 400b, which includes a portion 1200 of the original image 400 included within target area 504. The mask is also used by background/target image separator 140 to separate the target images within the image rendered by model renderer 130.

In the example image 400 of FIG. 2. part of hockey player 404 is covering a portion of dasher board 402 having target area 504 assigned thereto that is to be subjected to duration measurements according to the invention. In order to measure the duration target area 504 is included in an image stream including image 400 and to provide a quantitative measure of the duration that reflects the "viewability" of an image included within target area 504, the portion of hockey player 404 within target area 504, which is referred to as an occlusion, must be differentiated from the rest of target area 504 of original image 400, and the corresponding area removed from the remaining, unoccluded image within target area 504. To make this separation, occlusion separator 144 compares masked target area image 400b to masked reference image 700a. Any differences are presumed to be occlusions, i.e. images of objects between the camera and the surface (or synthetic surface) having target area 504 assigned thereto. Small differences between the masked reference image and the masked target image introduced by electronic noise in the camera may be accommodated using a number of techniques commonly practiced in the field of image processing, for example small region suppression. Imprecise positioning of the target area due to errors in the telemetry measurement system may be accommodated by filtering the telemetry data using commonly practiced target tracking techniques, for example Kalman filtering. In the illustrated example, masked target area image 400b, shown in FIG. 8, is compared to masked reference image 700a, shown in FIG. 6. The resulting occlusion image 400c shown in FIG. 9 includes only the occlusion which, in this illustrative example, is the portion/s of hockey player 404 captured in image 400 within target area 504. The rest of occlusion image 400c is blank. The occlusion separator 144 also creates an occlusion mask. The occlusion mask identifies the portions within the original image 400 that constitute the occlusion/s. In the example, the occlusion mask is generated from occlusion image 400c of FIG. 9. Masked background image 400a, masked target image 700a and occlusion image 400c may be combined by image combiner 146 to form a composite, or final, image 400e that may be inserted into the image stream in place of image 400. Target image 604 may include a synthetic image and, accordingly, the composite image generated provides a manipulated image including the synthetic image having an occlusion such that a portion of the synthetic image is included within the final image and appears as if the synthetic image were part of original image 400. The masked background image, masked target image and occlusion image are combined by the image combiner 146 to form a composite, or final, image. The final image may be used by image manipulation technologies for insertion into the image stream. Accordingly, the final image, or constituent components thereof, may be used by the image measurement system 100 for duration calculations of target areas included therein. The final image may then be inserted into the image stream when the reference image included synthetic images. However, the final image, or portions thereof, may be used only for calculating duration measurements associated with a target area and may not be inserted into the image stream. The latter scenario may be used to calculate duration measurements for physical signage having a target area assigned thereto in which case the final image composition facilitates a duration calculation of image data corresponding to a physical image associated with the target area while the image stream is not subjected to image insertion technologies. Accordingly, calculation of a duration measurement provides an indication of the duration that physical image/s are included within the image stream.

In the most simple form, a system of determining a duration measurement that target area 504 is included within an image stream includes counting a number of final images 400e in an image stream that include target area 504. The cumulative duration of a portion of an image stream having target area 504 and an image included therein may then be calculated based on, for example, the frames per second in the image stream transmission and/or capture. Thus, the system for measuring the duration that one or more target areas, and thus the duration image data is encompassed therein, is included in the image stream produced by the image capture system and/or image manipulation system includes analyzing the final images 400e, or constituent components thereof, for the inclusion of one or more target areas 504 and, by association with the target area, the corresponding inclusion of image data encompassed within target area 504.

Figure 11:
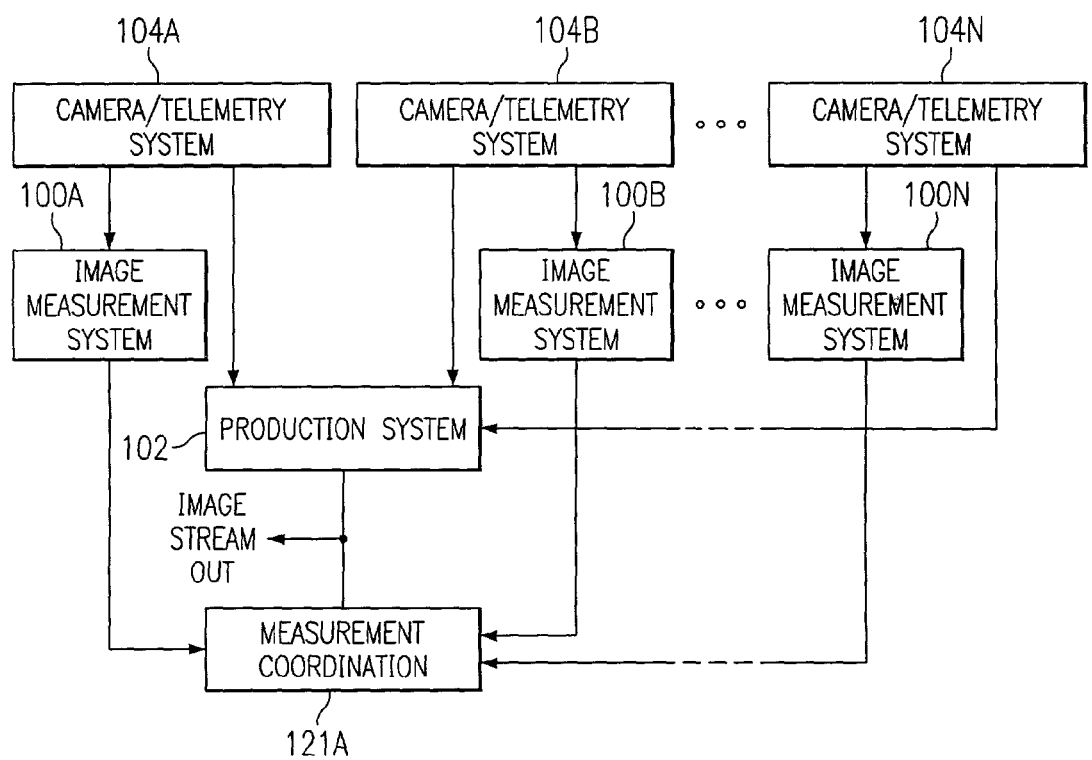
FIG. 11 is a schematic representation of an image measurement system where the measurement process for a video stream is implemented in a multi-camera system before a production system which chooses one or more of the multiple input signals as output.

With reference now to FIG. 11, there is illustrated an image capture and target area duration measurement system according to the teachings of the invention. One or more image capture and telemetry systems 104A–104N may capture an image stream from a site such as a sporting or entertainment venue. Each image capture and telemetry system 104A–104N includes a respective telemetry device. Accordingly, image data captured by an image capture and telemetry system 104A–104N has telemetry information encoded within the captured image stream. The telemetry information may include image capture device positioning data, image capture device orientation data, focal information related to the zoom of the image capture device, etc. Image and telemetry data may be output from each image capture and telemetry system 104A–104N to one or more image duration measurement systems 100A-100N and to a production system 102. Production system 102 may perform processing of captured image data and provides switching functions for selecting one of image capture and telemetry system 104A–104N image data to be output. Typically, an image stream output will include an image stream, or processed image stream, from a single image source at any given moment. To implement a duration measurement that is attractive to advertisers, the present invention provides for accurately measuring the duration a target area is included in an output image stream.

Because numerous image capture and telemetry systems 104A–104N may be used to supply production system 102 with various image views of an event, different views may include a particular target area while others exclude the target area. Accordingly, each image capture and telemetry system preferably embeds a tag that identifies the corresponding camera in the image and telemetry data captured thereby. Other techniques for identifying the camera and/or image and telemetry data are known. Accordingly, production system 102 can increment a counter that measures the duration a target area is included within an output image stream. Coordination of such measurements may be performed by a measurement coordination device or system 121A that is supplied with image measurement data obtained from image capture and telemetry systems 100A–100N as well as an output image stream. Accordingly, a counter assigned to a target area may be incremented by measurement coordination device or system 121A only when the target area is included in an image stream that is output by production system 102. The embodiment illustrated in FIG. 11 may be implemented using a variety of methods. For example, image capture and telemetry systems 104A–104N and image measurement systems 104A–104N may be implemented using the same or separate hardware or software platforms. These systems may also be used to virtually simultaneously capture image data from the same event at a single venue, or different events at different venues, and may be located at the same or separate venues, or collocated in a production control unit such as a production truck.

Figure 12:
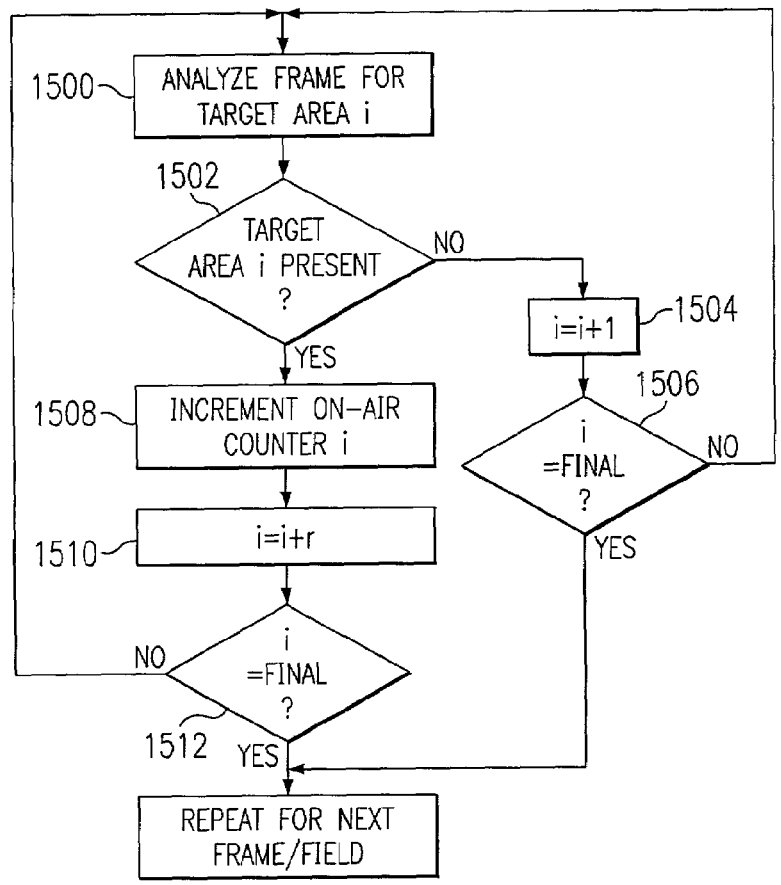
FIG. 12 is a flowchart of the processing of a module for calculating the duration an image is inserted into a video telecast.

In FIG. 12, there is a flowchart depicting the processing of a real-time duration calculation module 147. The method may be performed for one or more target areas included within an image in accordance with the methods of the present invention and duration calculations may accordingly be made with physical images within target area 504 as well as synthetic images inserted into target area 504. The module 147, in step 1500, receives input from the occlusion separator 144 and the background/target area reference separator 138. In a model having a plurality of target areas, each target area may be assigned a unique index (i) for identification thereof. The module analyzes final image 400e, or one or more constituent components thereof, for inclusion of the target area$_i$, at step 1502, and if target area$_i$ does not appear in the frame, index i is incremented, at step 1504, and compared against a FINAL index value, at step 1506, corresponding to the total number of target areas included within the model. If the FINAL index value has not been reached, the module processing returns to step 1500. If the FINAL index value has been reached at step 1506, module 147 processing ends for the current frame and is repeated from step 1500 for any subsequent frames.

Confirmation of inclusion of a target area$_i$ within the final image 400e at step 1502 causes an increment of an on-air counter$_i$ associated with target area$_i$ at step 1508. The counter$_i$ may be maintained within the calculation module 147 or another component of the image measurement system 100 and is preferably a digitally stored value representing an accumulated duration that the associated target area$_i$ is included within the image stream. The measured accumulated duration may be made in any number of units, for example duration of time in seconds, number of frames, number of fields, etc. Moreover, the duration unit may be dependent on a particular image standard used for outputting the image stream to an audience. For example, numerous video standards, such as National Television Standards Committee (NTSC) standards, phase alternating line (PAL) standards, and other video standards, respectively define transmission frequencies that define the number of image frames or fields included within an image stream per a given unit of time. Duration measurements of target areas included in an image stream transmitted to an audience according to any defined standards may be made in accordance thereof. Furthermore, the measured duration may be weighted by numerous factors including occlusion and foreground parameters effecting the viewability of an image within target area 504 as described more fully hereinbelow. Index i is next incremented at step 1510 and a comparison is then made between index i and the FINAL index at step 1512. If the FINAL index value has yet to be reached, the module 147 process returns to step 1500. If, however, the FINAL index value has been reached, the module processing is completed for the current frame and will continue at step 1500 for any subsequent frames.

Accordingly, any target areas included in the model and having a target image inserted into the target area in a final image 400e will have an associated counter$_i$ incremented for that particular final image 400e. Likewise, any target areas included in the model and not having an image inserted into the target area but, rather, having the target area assigned to an area of interest such as signage physically located within the site will have an associated counter$_i$ incremented for the particular final image 400e that indicates inclusion of the physical sign within the particular final image 400e of the image stream. Notably, counting of frames in which a target area is included in final image 400e may be made in real-time concurrently with processing of the image. Clearly, however, calculation of the frame number in which a target area is included in an image stream may be delayed with respect to the telecast, transmission or other processing of the image stream. Once a frame count for each target area$_i$ is made according to the process generally described in FIG. 12, the duration of any target image physical or synthetic) included within target area$_i$ may be calculated as the product of the frame counter$_i$ and the frames per second of the image stream. Thus, tariffs may be charged to advertisements made in the form of target images inserted into the image stream on a duration-basis that accounts for the duration the target image/s are included in the image stream. Likewise, tariffs may be charged to advertisements made in the form of physical signage located in the site that are captured in the image stream by calculating the duration a target area assigned to the particular area of the site including the physical signage is included in the image stream.

The technique for calculating the duration a target image is included in an image stream may be enhanced by accounting for factors that effect the "readability," or visibility, of a given target image. A more desirable duration measurement may be calculated by accounting for, and adjusting, the on-air counter for occlusions of a target image. According to the technique described hereinabove with reference to FIG. 12, a target area for a particular number of image frames would be assessed the same duration count, and consequently subject to the same tariffs implemented according to the teachings herein, regardless of whether the target area was wholly unobstructed or the target area was obstructed in any various proportion thereof. Such an implementation of the invention may be objectionable to potential advertisers.

Figure 10:
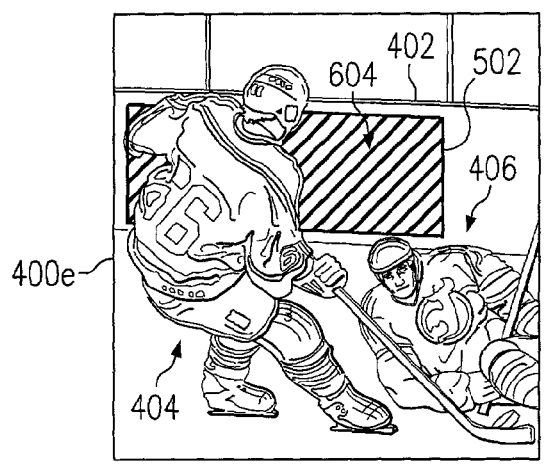
FIG. 10 is a final, composite image, containing a target image that is generated by combining the occlusion image of FIG. 7 with the masked background image and the masked target image.
Figure 13:
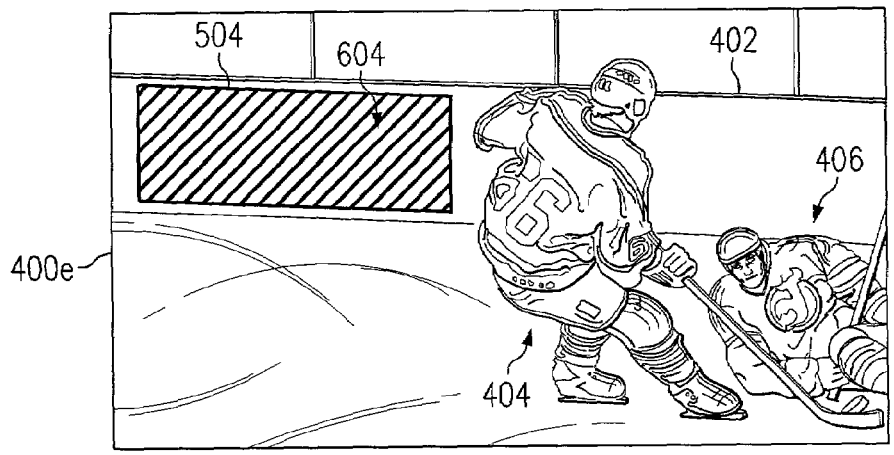
FIG. 13 is a final image illustrating the scenario depicted in FIG. 8 after an elapsed period of time.

In FIG. 13, there is illustrated a final image 400e including a first hockey player 404 and a second hockey player 406 in a scenario that may occur slightly after that depicted in FIG. 10. Notably, the occlusion depicted in FIG. 10 is no longer present, that is player 404 has moved beyond the target area 504 and target image 604 is now in full view and, consequently, the target image 604 will be, in whole, included within final image 400e. In comparison, only a portion of the target image 604 will be included within final image 400e for the scenario depicted in FIG. 10.

The module 147 may calculate an occlusion parameter ($\Delta$) to account for variations in the obstruction to a target area 504, and the target image 604 included therein, and tariffs applied to advertisers for telecast or other forms of viewing of target image 604 can be more appropriately levied in view of the overall viewability of target image 604. An exemplary arrangement for calculating an occlusion parameter involves interrogating, by module 147, the occlusion separator 144 for information regarding occlusion image 400c. The module 147 may acquire from the occlusion separator 144 a pixel count of the occlusion, that is a pixel count of only the portion of image 400e of hockey player 404 that is included within target area 504. Likewise, a pixel count of the target image 802 may be obtained from the background/target image separator 140. A simple occlusion parameter may be calculated from the pixel count of the occlusion and the pixel count of the target image 802 by, for example, generating a ratio of the occlusion image 400c pixel count to the target image 802 pixel count. The duration counter$_i$ associated with the target area$_i$ may be accordingly adjusted.

Figure 14:
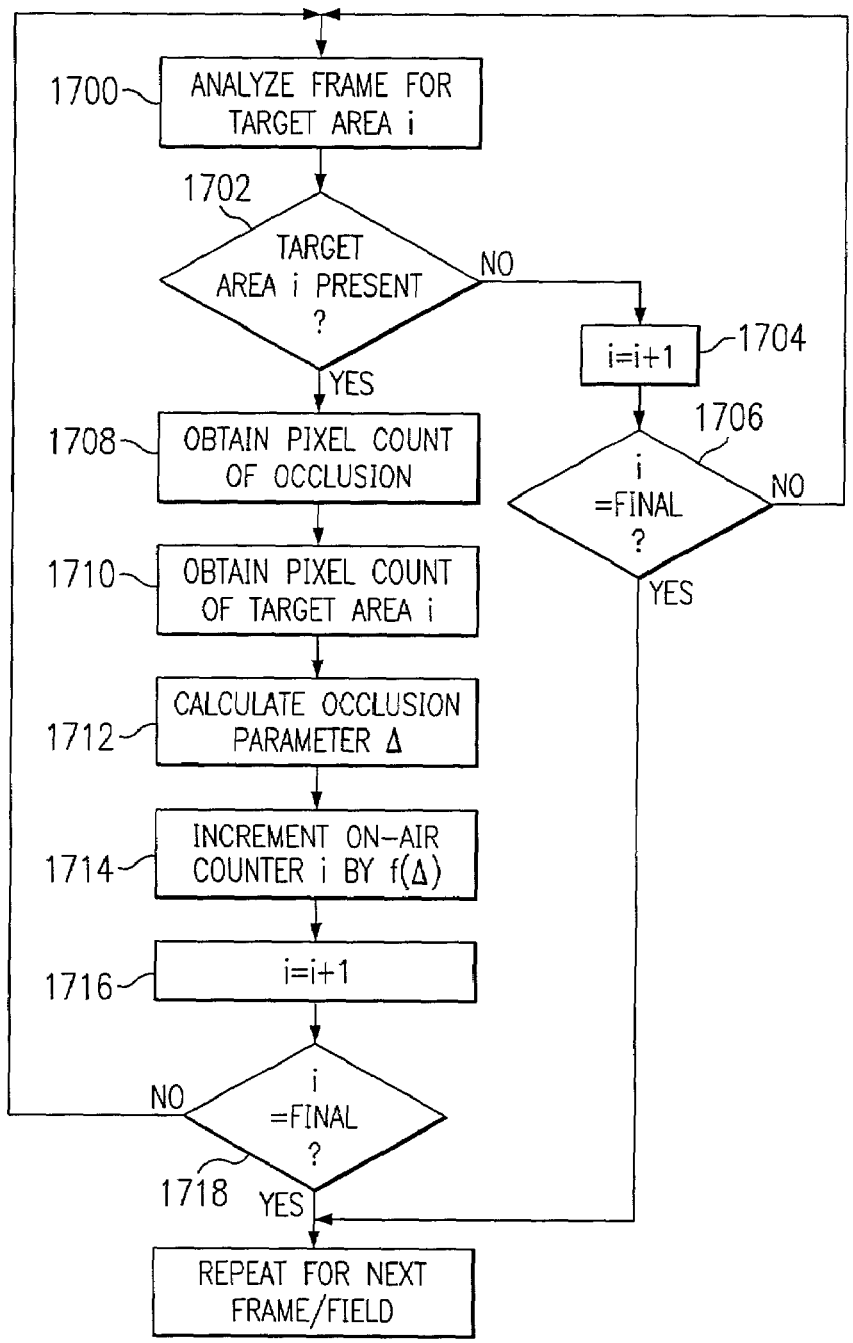
FIG. 14 is a flowchart depicting the processing of a module operable to adjust the calculation of the duration that an image is inserted into a video to reflect variations in occlusions of the inserted image.

In FIG. 14, there is a flowchart depicting the processing of a real-duration calculation module 147 operable to measure the duration that one or more target images are included in an image stream and to reflect variations in occlusions of the one or more target images in the calculated duration. The module 147, in step 1700, receives a final image 400e from the image combiner 146. In a model having a plurality of target areas, each target area may be assigned a unique index i for identification thereof. The model analyzes the frame for inclusion of target area$_i$, at step 1702, and if target area$_i$ does not appear in the frame, index i is incremented, at step 1704, and compared against a FINAL index value, at step 1706, corresponding to the number of target areas present in the model. If the FINAL index value has not been reached, the module processing returns to step 1700. If the FINAL index value has been reached at step 1706, module 147 processing ends for the current frame and is repeated from step 1700 for any subsequent frames.

Confirmation of a target area$_i$ at step 1702 results in module 147 obtaining a pixel count of any occlusion of the target area$_i$ at step 1708. Module 147 next obtains a pixel count of the target image$_i$ at step 1710. An occlusion parameter $\Delta$, for example a ratio of the occlusion image pixel count to the target image$_i$ pixel count, is next calculated by the module 147 at step 1712. The occlusion parameter may alternatively be calculated as a ratio of the occlusion image pixel count to the target area$_i$ pixel count. Other variations of the occlusion parameter are possible. A counter$_i$ is then incremented as a function of the occlusion parameter at step 1714. For example, a wholly unoccluded target area (or target image) may result in a unity increment of the counter$_i$ with variations in the increment to the counter$_i$ being made by subtracting $\Delta$ from a unity increment of counter$_i$. According to the exemplary calculation of $\Delta$, a wholly obstructed target area (or target image) would result in a zero increment of i because the pixel count of the occlusion would equal the pixel count of the target area$_i$ (or target image$_i$). Appropriately, no change in the counter$_i$ value would result even though the counter value processing has been performed. Furthermore, the counter$_i$ will increase inversely to the amount of occlusion of the target area.

The index$_i$ is next incremented at step 1716 and a comparison is then made between the index$_i$ and the FINAL index at step 1718. If the FINAL index value has yet to be reached, the module 147 process returns to step 1700. If, however, the FINAL index value has been reached, the module processing is completed for the current frame and will continue at step 1700 for any subsequent frames.

Accordingly, any target areas included in the model and having a target image therein within a final image 400e will have an associated counter$_i$ incremented for that particular final image 400e and any final count associated with a target area accumulated over an image stream will more accurately reflect the amount of actual viewability of the target image included therein. The duration of any target image included within a target area may then be determined as a product of the frame counter$_i$ and the frames per second of the image stream. Thus, tariffs may be more accurately levied on advertisements made in the form of target images included within target areas of an image stream on a duration-basis.

Figure 15A:
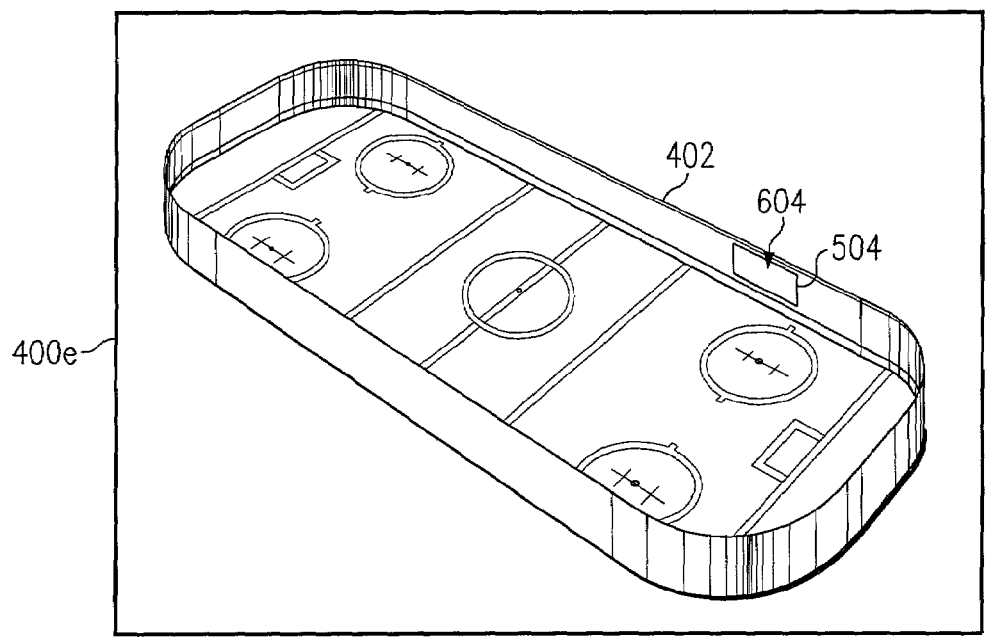
FIGS. 15A and 15B respectively illustrate a final, composite image obtained at different camera positions, pan and tilt angles, and zoom settings.
Figure 15B:
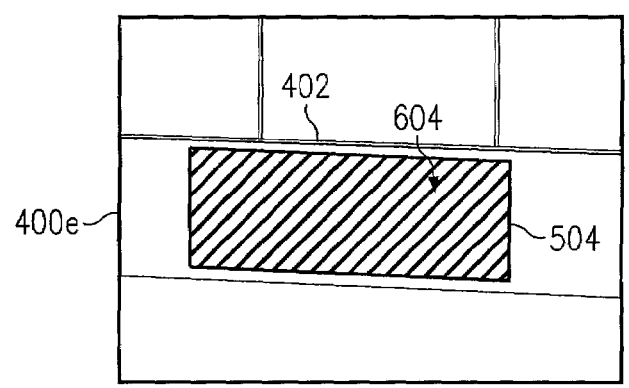

The invention as thus described may be further enhanced by accounting for camera zoom that effects the viewability of a target image included within a target area. In FIGS. 15A and 15B, there is respectively illustrated a final image 400e that may be obtained at different camera zooms. Within each final image, a target area 504 having a target image 604 therein is included in the final image 400e. The image 400e depicted in FIG. 15 may be analyzed according to the teachings described hereinabove to determine a duration calculation of target areas included within the image stream that includes final image 400e. Assuming equivalence in a particular scenario (that is, equivalence of target area occlusion, etc.). a target image 604 that is much less visible (FIG. 15A) due to camera zoom but nevertheless appearing in image 400e will have a duration counter associated therewith incremented equivalently to a target image 604 appearing in the foreground (FIG. 15B) of final image 400e according to the teachings hereinabove. Because such an implementation of an on-air duration count of a target image may be objectionable to potential advertisers, the present invention provides a further enhancement for modifying a counter associated with a target area, and thus an associated target image, according to variations in the camera zoom that effect the viewability of a target image.

The module 147 may calculate a foreground parameter γ to account for variations in camera zoom resulting in differences of the viewability of a target image 604 within a target area 504 and, accordingly, tariffs applied to advertisers of target image 604 can be more appropriately levied in view of the overall viewability of the target image 604. An exemplary arrangement for calculating a foreground parameter involves interrogating, by module 147, background/target image separator 140 for a pixel count of a target image 802, or alternatively a pixel count of the target area 504, included in a final image 400e. A simple foreground parameter may then be calculated from the pixel count of the target image 802 (or alternatively the target area 504) and the pixel count of the final image 400e by, for example, generating a ratio of the target image 802 (or target area 504) pixel count to the final image 400e pixel count. Generally, the pixel count of final image 400e is a known and fixed constant. The duration calculation associated with target image 802 may be adjusted as a function of the ratio of the target image 802 pixel count and the final image 400e pixel count to accurately reflect the overall viewability of target image 802.

Figure 16:
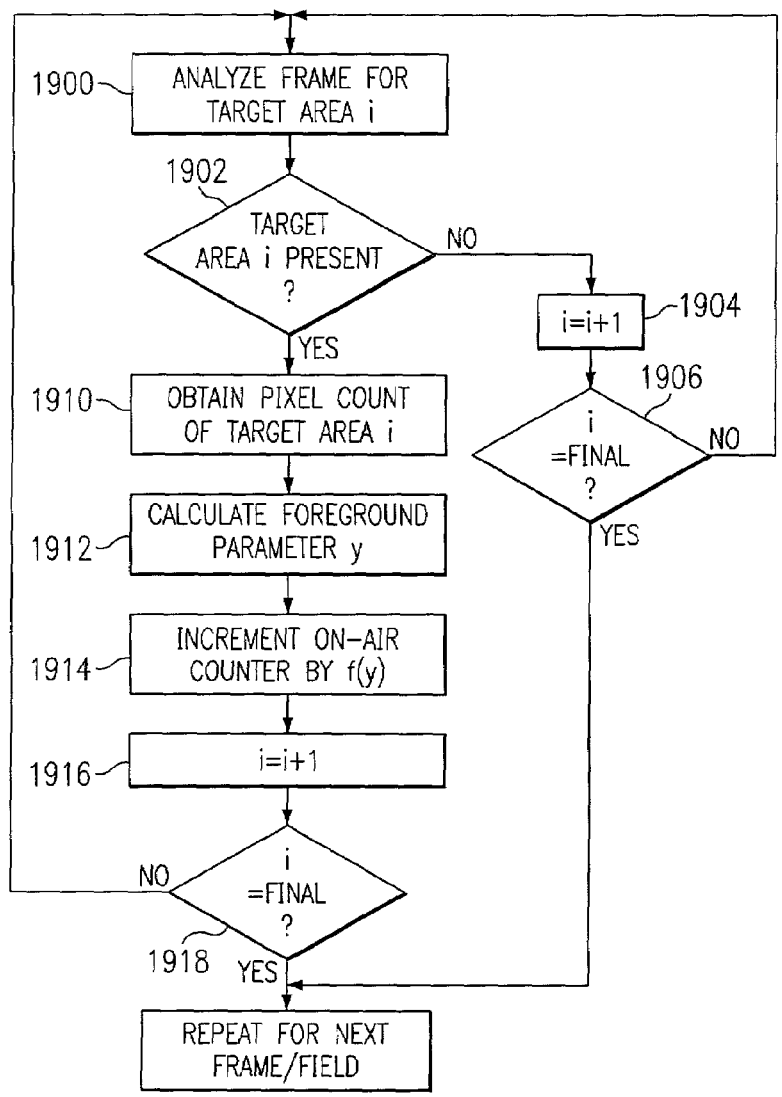
FIG. 16 is a flowchart depicting the processing of a module operable to adjust the calculation of the duration that an image is inserted into a video to reflect variations in viewability of an inserted image resulting from differences in camera zoom.

In FIG. 16, there is a flowchart depicting the processing of a real-time duration calculation module 147. The module 147, in step 1900, receives a final image 400e from image combiner 146. As noted above, in a model having a plurality of target areas, each target area may be assigned a unique index$_j$ for identification thereof. The model analyzes the frame for inclusion of target area$_i$, at step 1902, and if the target area$_i$ does not appear in the frame, index$_i$ is incremented, at step 1904, and compared against a FINAL index value, at step 1906, corresponding to the number of target areas present in the model. If the FINAL index value has not been reached, the module processing returns to step 1900. If the FINAL index value has been reached at step 1906, module 147 processing ends for the current frame and is repeated from step 1900 for any subsequent frames.

Confirmation of inclusion of a target area$_i$ within image 400e at step 1902 results in module obtaining a pixel count of the target area$_i$ (or target image$_i$) at step 1910. Foreground parameter γ, for example a ratio of the target image$_i$ 802 pixel count to the final image 400e pixel count, is next calculated by the module 147 at step 1912. A counter$_i$ is then incremented by a function of the foreground parameter at step 1914, for example by simply incrementing the counter$_i$ by the computed value of γ. A target image$_i$ occupying the entirety of final image 400e would result in a unity increment of counter$_i$ according to the exemplary computation of the foreground parameter γ. Variations in camera zoom resulting in a target image appearing increasingly distant in the background would result in a proportional reduction in the increment to the counter$_i$. Index$_i$ is next incremented at step 1916 and a comparison is then made between the index$_i$ and the FINAL index at step 1918. If the FINAL index value has yet to be reached, module 147 processing returns to step 1900. If, however, the FINAL index value has been reached, the module processing is completed for the current frame and will continue at step 1900 for any subsequent frames.

Thus, any target areas included in the model and having a target image included therein in a final image 400e will have an associated counter incremented for that particular final image 400e and any final count associated with a target area accumulated over an image stream will accurately reflect variations in the viewability of the target image resulting in different camera zooms used to produce any number of final images 400e. The duration of any target image included within a target area included in one or more frames of an image stream may then be determined as a product of the frame counter and the frames per second of the image stream. Thus, tariffs may be more accurately levied on advertisements made in the form of target images within target areas included in an image stream.

Preferably, the image measurement system illustrated in FIG. 1 may have communication channels between the director's console 123 and the image calculation module 147. These thresholds may be set or defined by an operator of the director's console 123. It has been considered that the amount of occlusion of a particular target area, or target image, may be so great in some instances while the target area or target image is still included within a frame of a telecast that viewers of the telecast may fail to recognize the particular target image included within the occluded target area. For example, a target image may include only a corporate insignia that visibly occupies only a small portion of a target area when included in the image stream. If a portion of the target area is occluded, the target area may itself have a significant portion thereof unoccluded while the insignia inserted in the form of a target image is unviewable, or unrecognizable, to viewers of the image stream. According to the novel techniques above, in such a circumstance the counters associated with the target area would still be incremented because a portion of the target area is included with the associated frame. Any tariffs calculated as a function of the counter would then include at least a portion thereof for telecast frames where the insignia is unviewable or unrecognizable. Thresholds may be implemented to facilitate remedying of such a situation. An occlusion threshold may be defined such that increments to the counter are not allowed when a specified percentage of the target area is occluded, that is the occlusion threshold disallows increments to the counter if the occlusion parameter is greater than the occlusion threshold. If more than one target area is included in the site model, occlusion thresholds may be defined for each target area and can be implemented independent of one another. Thus, the advertising director could tailor tariffs specifically towards particular target images to be included within a given target area.

The occlusion threshold may also be implemented as a function of the percentage of the target area, or target image, that appears on screen, that is within a frame, that is not occluded. For example, during sporting events, camera panning occurs often and will result in frames where target areas are only partially included within a frame. An occlusion parameter distinct from that described above may be implemented in these situations. Thus, a different occlusion threshold for disallowing increments to a counter associated with a target area may be implemented for target areas that are not wholly included within a frame.

Yet another embodiment of the invention utilizes sub-target areas 504A and 504B within a target area 504. Tariffs may be calculated on individual sub-target areas by assigning individual counters to the sub-target areas. Individual and independent occlusion parameters and foreground parameters may be calculated for each of the sub-target areas 504A and 504B to facilitate additional refinements in the duration calculation techniques described herein. The sub-target areas 504A and 504B may, for example, be useful when a target image includes graphics, such as a corporate logo, as well as text. Because graphics may be more or less recognizable than text, a target image that includes both can have multiple sub-target areas defined within a larger target area. One or more target images may be included within target area 504 such that the duration calculation of sub-target areas 504A and 504B allows independent calculation of the duration of the target image or images within the target area 504. Accordingly, independent counters may be respectively associated with the sub-target areas. As of consequence, tariffs may be implemented individually for the sub-target areas. Likewise, individual occlusion parameters and/or foreground parameters may be calculated for each of the sub-target areas 504A and 504B. Different occlusion thresholds may be set for each of the sub-target areas 504A and 504B as well.

It should be understood that the particular technique for calculating an occlusion parameter and a foreground parameter and/or assigning thresholds thereto that have been described are exemplary only. Variations for accounting for differences in viewability due to occlusions and variations in zoom of a camera capturing an image stream are possible. For example, a percentage of a target area that is within an image frame independent of whether or not it is occluded may be calculated. The total area of all occlusions to the target area may then be subtracted from the area of the complete image frame prior to calculating the percentage of the target area that is within the image frame.

Figure 18:
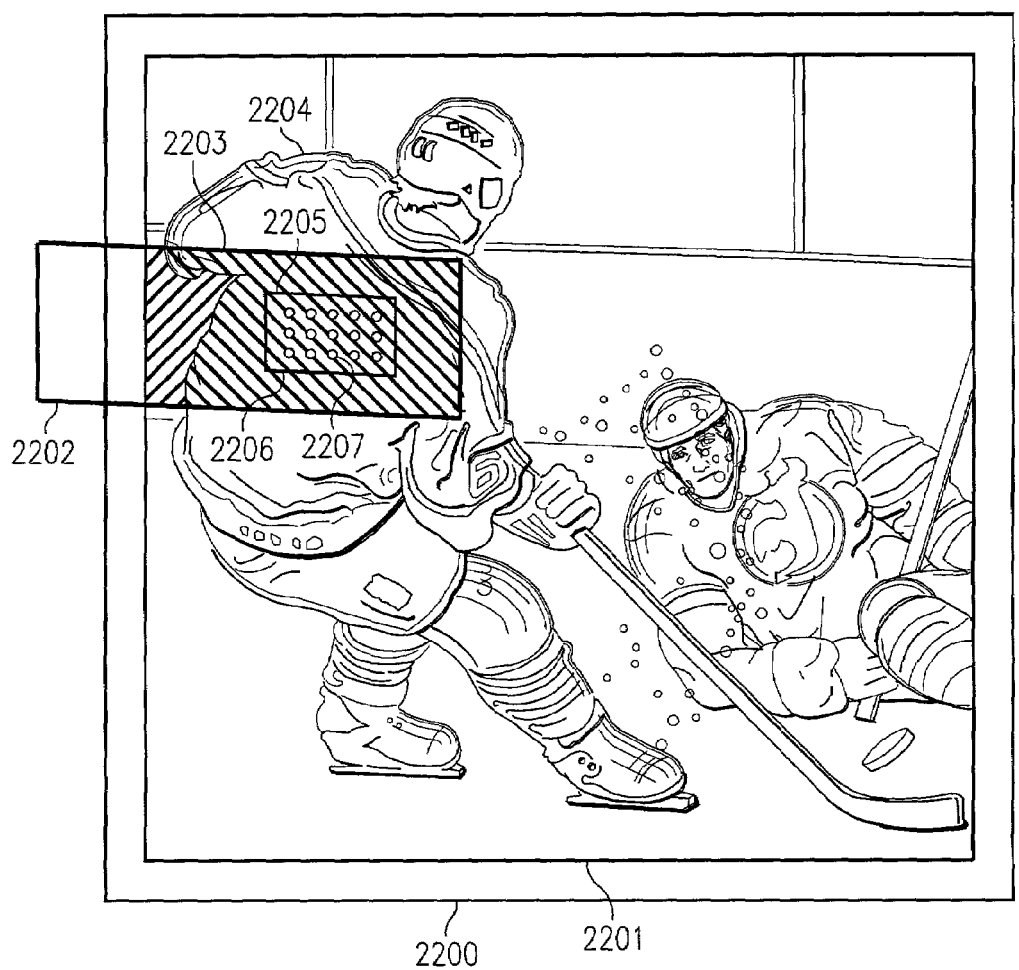
FIG. 18 is an image frame having various image areas designated for specifying thresholds for allowing/disallowing increments to a target area counter.

Additionally, variations for foreground compensation of a target area may be made. The counting of a frame/field including a target area may be dependent upon a threshold for the calculated percentage of target area within the overall frame area and percentage of screen area. Referring to FIG. 18, a total area 2200 of image frame, or frame signal, is designated $A_S$; a total area of the viewable portion of the image frame 2201 is designated $A_V$; an entire area of the target area 2202 rendered according to the telemetry from the camera is designated $A_T$; an area 2203 of the target area visible on-screen is designated $A_{T_S}$; and a total area 2204 of all occluding bodies of the target area is designated $A_{T_O}$. $\theta_T$ is defined as a threshold for the frame area of the sign for allowing a count increment. Preferably, $\theta_T$ is user-settable. $\theta_{T_o}$ is a corresponding threshold in where the area of all occluding bodies is taken into consideration. $\theta_S$ represents a user-settable threshold for visible target area that does not account for occluding bodies as a percentage of screen area. $\theta_{S_o}$ denotes the threshold for visible target area accounting for occlusions as a percentage of image frame area. The following possible tests may then be performed for determining whether a counter assigned to a target area is to be incremented:

$$\frac{A_{T_S}}{A_T} > \theta_T \quad (1)$$

$$\frac{A_{T_S} - A_{T_O}}{A_T} > \theta_{T_O} \quad (2)$$

$$\frac{A_{T_S}}{A_V} > \theta_S \quad (3)$$

$$\frac{A_{T_S} - A_{T_O}}{A_V} > \theta_{S_O} \quad (4)$$

Equations 1–4 allow thresholds to be set that govern increments to counters assigned to respective target areas. Allowance/disallowance of increments to a counter of a target area may also be determined from a logical or weighted combination of these equations as desired.

The present invention contemplates including one or more sub-target areas defined within a target area, e.g., an advertiser's logo within a sign (physical or synthetic) corresponding to a target area. Referring again to FIG. 18, the total area 2205 of a sub-target area within target area 2202 is designated as $A_L$; the area 2206 of the sub-target area within the visible image frame is designated $A_{L_s}$; the area 2207 of the sub-target area occluded by all occluding bodies is designated $A_{L_o}$. The following thresholds may then be defined: $\phi_L$ is a threshold of the image frame area of the sub-target area as a percentage of the total sub-target area; $\phi_{L_o}$ is a threshold of the image frame area less the total area of all occluding bodies as a percentage of the total sub-target area; $\phi_S$ is a threshold of the sub-target area as a percentage of the total visible image frame area; and $\phi_{S_o}$ the threshold relative to the total image frame area less any occluded area of the sub-target areas.

The following tests for allowing/disallowing increments to a counter assigned to a target area may then be defined:

$$\frac{A_{L_S}}{A_L} > \phi_L \quad (5)$$

$$\frac{A_{L_S} - A_{L_O}}{A_L} > \phi_{L_O} \quad (6)$$

$$\frac{A_{L_S}}{A_V} > \phi_S \quad (7)$$

$$\frac{A_{L_S} - A_{L_O}}{A_V} > \phi_{S_O} \quad (8)$$

Allowance/disallowance of increments to a counter of a target area may also be determined from a logical or weighted combination of equations 5–8. As an added level of sophistication, the equations 1–4 could be combined with equations 5–8 to provide a hybrid metric for allowance/disallowance of counter increments.

Figure 17:
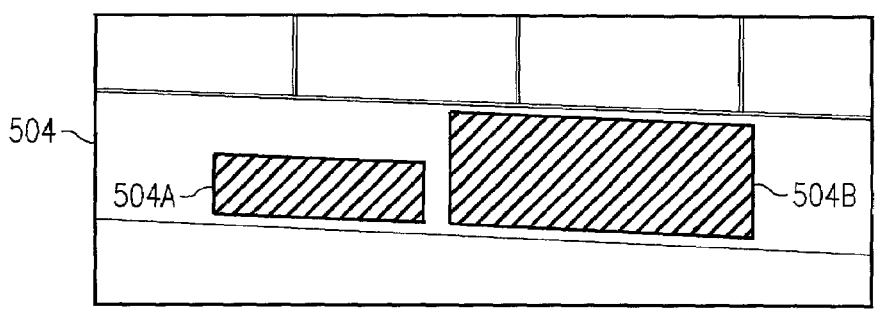
FIG. 17 illustrates a target area having multiple sub-target areas according to an embodiment of the present invention.

Preferably, an image measurement system 100 including an on-air duration calculation module 147 would implement an on-air duration calculation having adjustments for both occlusion and foreground variations as described with reference to FIGS. 17 and 19 and/or with reference to one or more of equations 1–8. However, the teachings of the invention, in the most simple form, may be implemented according to FIG. 12 and the accompanying description. As earlier alluded to, calculations may be performed on a field, rather than a frame, based mechanism. Thus, the described counters for measuring the duration a target area is included within an image stream may be performed by analysis of one or more fields of a frame of the video stream being telecast.

Other modifications of the invention are possible. For example, the techniques described allowing real-time calculations of the duration that one or more target areas are included within an image stream also provide a mechanism for ensuring a desired duration a synthetic image is included within an image stream is achieved. For example, an advertiser may contract to have an advertisement included in an image stream, such as a telecast of a sporting event. The present invention allows the contract to specify a duration, such as a maximum exposure time, a minimum exposure time or a precise exposure time, that an advertisement, or other synthetic image, is included in an image stream. The contract may specify a number of units, such as seconds or frames of an image stream, an advertisement or other image is to be included in the image stream. Accordingly, advertising fees levied for inclusion of an advertisement in an image stream may be made on a duration basis prior to telecast, or other transmission mechanism, of the image stream. This is a notable improvement over prior art techniques that require calculation of the duration an advertisement is included in an image stream to be made after the telecast or other transmission of the image stream. Duration-based fees for images included within an image stream may not be levied until after telecast of the image stream according to techniques known in the art. Additionally, the duration a particular image is included within an image stream may not be defined prior to transmission of the telecast according to the prior art techniques.

A synthetic image may have a desired exposure time defined prior to transmission of an image stream that is to have the synthetic image inserted therein according to an embodiment of the invention. Assigning a synthetic image to a target area for insertion therein and allowing the target area to be dynamically reassigned during an image stream transmission may facilitate meeting a predefined, desired duration an image is to be included in an image stream according to the teachings of the invention. For example, during a sporting event telecast, a synthetic image assigned for insertion in a target area may have a pre-defined desired exposure duration defined prior to transmission of the image stream. Real-time calculation of the exposure time of the duration the target area having the synthetic image assigned thereto may indicate, at some point during the image stream transmission, that the target area may not be included within the image stream for the desired duration of the advertiser. The synthetic image may be reassigned to another target area that is determined to provide a greater likelihood to be included within the image stream for the original, pre-defined duration associated with the image data. For example, an advertiser may contract to have a synthetic image inserted in a target area for a predefined duration of a sports venue such as a right field wall of a baseball field. During transmission of the baseball game, analysis of duration measurements, metrics or other statistical data collected during capture of the image stream and calculated for the target area having the image data assigned thereto may indicate that the target area will likely be included for a duration that is less than the desired duration indicated and agreed upon by the advertiser prior to transmission of the image stream from the venue. Accordingly, the image data assigned to the target area may be reassigned to another target area. For example, if during transmission of the image stream it is determined that the actual duration the target area having image data assigned thereto is likely to have a duration that is less than a predefined desired duration, the image data assigned to the target area may be reassigned to another target area, for example a target area in a more visible area of the venue, such as a center field wall, having duration calculations indicating a greater exposure duration relative to the target area having the image data originally assigned thereto. Thus, once the image data is reassigned to another target area, the duration the image data is included in the image stream may be increased in an attempt to have the image data included within the image stream to achieve the predefined, desired duration. Likewise, the image data may be reassigned to multiple target areas and reassignment thereof does not preclude maintaining an assignment of the image data with a target area from which it is reassigned, that is the image data may be assigned to a first target area and may be reassigned to a second target area upon which the image data originally assigned to the first target area will appear in images of the image frame including either the second target area or the first and second target area. Reassignment of image data may be made to any number of target areas in an attempt to include the image data assigned thereto within the image stream for a predefined duration. Accordingly, variations of the counter mechanisms described herein may be made to facilitate duration measurements of image data included within one or more target areas and that may be reassigned to other target areas. For example, counters assigned to a target area may similarly be assigned to particular image data that may be inserted into images of an image stream and calculated according to the teachings herein. Thus a particular counter associated with image data that is to be inserted into a target area may be incremented only when the target area is included in an image of the image stream and when the target area has particular image data included therein. The counter may be reassigned to a different target area upon reassignment of image data. Furthermore, increments to the counter may be made upon determination of inclusion of any one of a plurality of target areas within an image of the image stream thereby facilitating reassignment of image data and duration calculations thereof.

The foregoing description is made in reference to exemplary embodiments of the invention. However, an embodiment may be modified or altered without departing from the scope of the invention, which scope is defined and limited solely by the appended claims.

What is claimed is:

1. A method of calculating the duration of a target area is included within an image stream obtained by an image capture system at a physical site, the method comprising:
    analyzing at least one field of the image stream for inclusion of the target area, wherein the target area is defined in a three-dimensional computer model of the site, the three-dimensional computer model being defined independently of a viewpoint of a camera generating the image stream, and the target area being located within the field using information on where the camera is positioned and pointing and the three-dimensional computer model;
    automatically incrementing a counter upon confirmation that the target area is included within the at least one field; and
    calculating an occlusion parameter of the target area;
    wherein the counter is incremented by the numerical result of the occlusion parameter subtracted from one.

2. The method according to claim 1, wherein a fee is calculated in response to the counter.

3. The method according to claim 1, wherein the occlusion parameter is calculated in response to a pixel count of an occlusion of the target area and a pixel count of the target area.

4. The method according to claim 3, wherein the occlusion parameter is a ratio of the pixel count of the occlusion to the pixel count of the target area.

5. The method according to claim 1, further comprising defining an occlusion threshold, an increment to the counter being disallowed if the occlusion threshold exceeds the occlusion parameter.

6. The method according to claim 1, further comprising:
    assigning image data for insertion into the target area; and
    reassigning the image data to a second target area to be included in the image stream.

7. The method according to claim 6, further comprising calculating the duration the image data is included in the image steam by summing respective increments to the counter that is associated with the first target area with increments to a second counter that is associated with the second target area, the increments summed limited to respective increments made to the target area when the image data is respectively assigned to one or more of the target area and the second target area.

8. The method according to claim 6, wherein reassigning the image data to a second target area further comprises reassigning the image data to the second target area as the image stream is captured.

9. The method according to claim 6, further comprising:
    specifying a duration the image data is to be included within the image stream prior to capture of the image stream; and
    collecting, prior to reassigning the image data, statistical data indicative of the duration that at least one of the group consisting of the target area and the second target area is included in the image stream as the image stream is captured.

10. The method of claim 1, wherein the target corresponds to an imaginary surface defined in the three-dimensional computer model and does not correspond with a physical element at the site.

11. A method of calculating the duration a target area is included within an image stream obtained by an image capture system, the method comprising:
    analyzing at least one field of the image stream for inclusion of the target area, wherein the target area is defined in a three-dimensional computer model of the site, the three-dimensional computer model being defined independently of a viewpoint of a camera generating the image stream, and the target area being located within the field using information on where the camera is positioned and pointing and the three-dimensional computer model;
    automatically incrementing a counter upon confirmation that the target area is included within the at least one field; and
    calculating a foreground parameter of the target area, the foreground parameter compensating for a zoom of the image capture system;
    wherein the foreground parameter is calculated in response to a pixel count of the target area and a pixel count of the at least one field.

12. The method according to claim 11, wherein the foreground parameter is a ratio of the pixel count of the target area to the pixel count of the at least one field.

13. A method of calculating the duration a target area is included within an image stream obtained by an image capture system at a physical site, the method comprising:
    analyzing at least one field of the image stream for inclusion of the target area, wherein the target area is defined in a three-dimensional computer model of the site, the three-dimensional computer model being defined independently of a viewpoint of a camera generating the image stream, and the target area being located within the field using information on where the camera is positioned and pointing and the three-dimensional computer model;
    automatically incrementing a counter upon confirmation that the target area is included within the at least one field;
    calculating a foreground parameter of the target area;
    wherein the counter is incremented by an increment that is equivalent to the calculated value of the foreground parameter.

14. A method of calculating the duration a target area is included within an image stream obtained by an image capture system, the method comprising:
    analyzing at least one field of the image stream for inclusion of the target area;
    automatically incrementing a counter upon confirmation that the target area is included within the at least one field;
    assigning image data for insertion into the target area;
    specifying a duration the image data is to be included within the image stream prior to capture of the image stream;
    reassigning the image data to a second target area to be included in the image stream; and
    collecting, prior to reassigning the image data, statistical data indicative of the duration that at least one of the group consisting of the target area and the second target area is included in the image stream as the image stream is captured;

wherein reassigning the image data to a second target area further comprises reassigning the image data to the second target area in response to the statistical data indicating the second target area has a higher duration of inclusion in the image stream than the target area.

15. A system for calculating the duration a target area is included in an image stream of a physical site, the system comprising:
a three-dimensional computer model of a target area from a site from which the image stream is captured, the target area being virtually defined by the model and not corresponding to a physical element at the site; the three-dimensional computer model being defined independently of a viewpoint of a camera producing the image stream, the target area being located within the field using information on where the camera is positioned and is pointing and the three-dimensional computer model;
a duration calculation module that identifies inclusion of the target area in the at least one field of the image stream and calculates an occlusion parameter for the target area, the module including a counter that is incremented as a function of the occlusion parameter upon confirmation of inclusion of the target area within the at least one field; and
wherein the target area is included in the at least one field when the site is included in the image stream.

16. The system according to claim 15, further comprising:
image insertion system for inserting a target image into at least one of the plurality of fields of the image stream, the image insertion system in communication with the duration calculation module; and
an image capture system for providing an image to the image measurement system, the image supply system in communication with the image insertion system.

17. The system according to claim 15, wherein the duration calculation module is included within the image insertion system.

18. The system according to claim 15, wherein the image measurement system further comprises:
a model renderer for generating a synthetic image based on a predefined three-dimensional reference model of a target area within a site from a known position of a camera included in the image supply system, the synthetic image having the target image inserted in the target area thereof;
an image separator for masking from a video image contained within a frame of a video signal generated by the camera, the target area to create a masked background image, a masked reference image being created by the image separator by separating a reference image from the remainder of the image; and
an occlusion separator operable to compare the masked target area image to the masked reference image, the difference therebetween representing an occlusion of the target image.

19. The system according to claim 18, wherein the module calculates the occlusion parameter from information obtained from the image separator.

20. The system according to claim 18, wherein the module calculates a foreground parameter from information obtained from the image insertion system.

21. The system according to claim 18, wherein the target area comprises image data selected from the group consisting of signage existing in a site from which the image stream was captured and synthetic images not present in the site.

22. The system according to claim 18, further comprising a model of a target area from a second site from which the image stream is captured; and
a duration calculation module that identifies inclusion of the target area from the second site in the at least one field of the image stream, the module including a counter that is incremented upon confirmation of inclusion of the target area within the at least one field, and wherein the target area from the second site is included in the at least one field when the second site is included in the image stream.

23. The system according to claim 15, wherein the occlusion parameter is calculated as a ratio of a pixel count of the occlusion to a pixel count of the target image.

24. The system according to claim 20, further comprising an image combiner for producing a final image from to masked background image and the occlusion, the module obtaining a pixel count of the target area from the image separator and a pixel count of the final image from the image combiner, the foreground parameter being calculated from the pixel count of the target area and the pixel count of the final image.

25. The system according to claim 20, wherein the incrementation is a function of the foreground parameter.

26. The system according to claim 15, wherein an increment to the counter is disallowed in the event the occlusion parameter exceeds an occlusion threshold.

27. A method of tracking of appearance of synthetic images inserted into an image stream obtained by an image capture system having a video camera at a physical site, the method comprising:
for each image frame in the image stream,
identifying a target area within the original image frame based on at least a predefined three-dimensional model of a target area within the site and the camera's position and pointing direction, the three-dimensional computer model being defined independently of a viewpoint of a camera generating the image stream;
rendering for the target area a synthetic image based at least on the predefined three-dimensional model of the target area;
rendering a mask for separating the target area and background area within the image frame;
rendering an un-occluded reference image for the target area;
separating occlusions within the at least one target area of the original image frame by comparing the target area in the original image frame to the reference image for the target area; and
combining the background of the original image, the synthetic image, and the image of the occlusions into an output image; and
automatically computing a value representative of an appearance of the synthetic image in one of the image frame and a field within the image frame, the value taking into account occlusions of the synthetic image.

28. The method of claim 27, further comprising summing for each frame of the image stream the values representative of the appearance of the synthetic image in one of the image frame and the field within the image frame.

29. The method of claim 27, wherein automatically computing a value representative of appearance of the synthetic image, further comprises automatically computing an occlusion parameter representative of an amount by which the synthetic image in the target area is occluded and adjusting a pre-assigned value representative of the target image appearing in the image as a function of the occlusion parameter.

30. The method of claim 29, further comprising automatically computing a foreground parameter representative of viewability of the synthetic image in the image frame as a function of camera focal length, and adjusting the preassigned value as a function of the foreground parameter.

31. The method of claim 27, wherein the value further takes into account viewability of the synthetic image in the image frame as a function camera focal length.

32. The method of claim 27, wherein the value representative of the appearance of the synthetic is automatically computed based on a predefined portion of the synthetic image.

33. Image processing apparatus comprising:
an image insertion system, the image insertion system including
an identifying mechanism identifying a target area within the original image frame based on at least a predefined three-dimensional model of a target area within the site and a position and pointing direction of a camera generating the image stream, the three-dimensional computer model being defined independently of a viewpoint of a camera generating the image stream;
a mechanism for rendering for the target area a synthetic image and an unoccluded reference image for the target area using the predefined three-dimensional model of the target area and the position and pointing direction of a camera;
a mechanism for rendering a mask for separating the target area and background area within the image frame;
a mechanism for separating occlusions within the at least one target area of the original image frame by comparing the target area in the original image frame to the reference image for the target area; and
a mechanism for combining the background of the original image, the synthetic image, and the image of the occlusions into an output image; and
an image measurement mechanism for automatically computing a value representative of appearance of the synthetic image in one of the image frame and a field within the image frame, the value taking into account occlusions of the synthetic image.

34. The apparatus of claim 33, wherein the image measurement system further comprises a summing mechanism for summing for each frame of the image stream the values representative of the appearance of the synthetic image in one of the image frame and the field within the image frame.

35. The apparatus of claim 34, wherein the image measurement system further comprises a mechanism for automatically computing an occlusion parameter representative of an amount by which the synthetic image in the target area is occluded and adjusting a pre-assigned value representative of the target image appearing in the image as a function of the occlusion parameter.

36. The apparatus of claim 35, further comprising a mechanism for computing a foreground parameter representative of viewability of the synthetic image in the image frame as a function of camera focal length, and adjusting the preassigned value as a function of the foreground parameter.

37. The apparatus of claim 33, wherein the value further takes into account viewability of the synthetic image in the image frame as a function camera focal length.

38. The apparatus of claim 33, wherein the value representative of the appearance of the synthetic image is automatically computed based on a predefined portion of the synthetic image.

* * * * *